May 15, 1962     E. J. SCHAEFER     3,035,192
CASING AND STATOR ASSEMBLY FOR ELECTRIC MOTOR
Filed Sept. 1, 1959
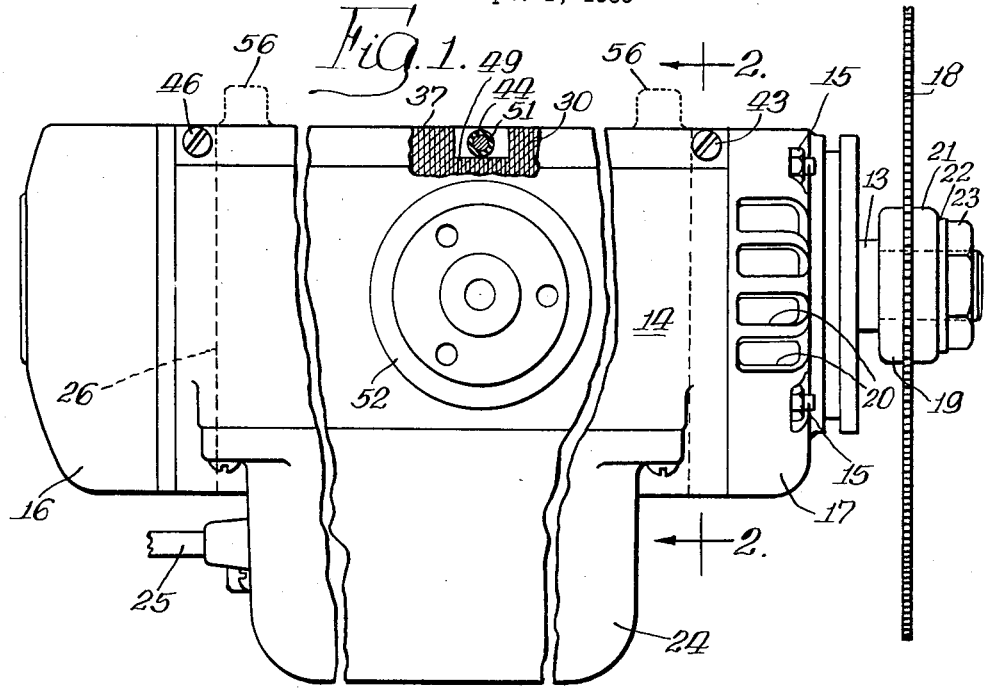
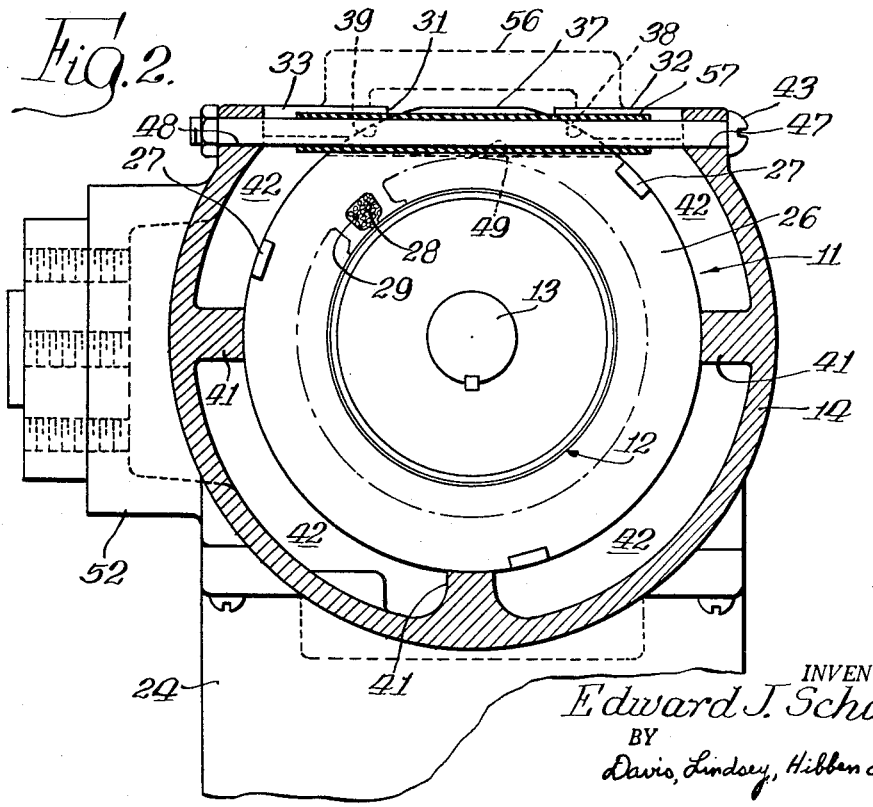
INVENTOR.
Edward J. Schaefer,
BY Davis, Lindsey, Hibben & Noyes
Attys.

United States Patent Office 3,035,192
Patented May 15, 1962

3,035,192
CASING AND STATOR ASSEMBLY FOR
ELECTRIC MOTOR
Edward J. Schaefer, % Franklin Electric Co.,
400 E. Spring St., Bluffton, Ind.
Filed Sept. 1, 1959, Ser. No. 837,388
14 Claims. (Cl. 310—89)

The present invention relates to electric motors and more particularly to a casing-stator core assembly for an electric motor.

In industry, in recent years, there has been a trend toward the use of individual drives for power tools, such as rotary saws and the like, with the saw blade or similar tool mounted directly on the motor shaft. In such tools it is important that the height or distance from the shaft to the periphery of the motor facing the work be as small as possible without sacrificing other desirable motor characteristics. This is so because this shaft height or distance dictates the limit to which the tool can operate. For example, in a power saw having a circular blade mounted directly on a drive shaft, the maximum depth of cut possible will be limited to the radial clearance between the periphery of the motor facing the work and periphery of the saw blade. Thus, a lower shaft height (or shorter distance) will provide greater clearance and will permit a deeper cut by the blade. Consequently, a reduction of the shaft height of a given size electric motor of even one-quarter or one-eighth of an inch is of important commercial significance.

It is also important in motors for saws and similar tools that none of the desirable features of conventional motors be unduly sacrificed in favor of low shaft height. Such features are, for example, the electrical characteristics of such motors, shielding of the motor against dust, and adequate ventilation in the motor and rigidity.

Accordingly, it is a primary object of the present invention to provide a novel electric motor having a minimum shaft height and also having all of aforementioned desirable features of conventional electric motors.

Another object of the invention is to provide a novel motor of the foregoing character which is easily manufactured and is inexpensive.

Still another object of the invention is to provide a novel motor of the foregoing character which is adapted to be used with power saws and the like to give a maximum depth of cut for a given size of blade.

A further object of the invention is to provide a novel casing and stator assembly for a conventional form of electric motor which results in a minimum shaft-to-periphery distance in a selected direction from the motor shaft.

Other objects and advantages of the invention will be apparent from the following description taken in conjunction with the accompanying drawing, wherein:

FIG. 1 is an elevational view of an electric motor embodying the features of the invention; and FIG. 2 is an enlarged sectional view taken along line 2—2 in FIG. 1.

The objects of the invention are accomplished by providing an electric motor in which that portion of the casing and stator core assembly for the motor, located on one side of a diametral plane extending longitudinally through the assembly and perpendicular to a selected direction, is confined or limited to the zone between that plane and another parallel plane touching the outer periphery of the core. More specifically, the casing is provided with a longitudinally extending gap along the side of the motor facing the selected direction, providing spaced edge portions. The stator core, for the motor, a generally annular core, is mounted in the casing with a longitudinal area of its outer peripheral surface located between the edge portions and projecting through the gap. The core is clamped in the casing by clamping means extending across the gap and pulling the edge portions toward each other. The exposed surface area on the core is the outermost portion of the motor in the selected direction and defines or establishes the outer limit of the assembly. In other words, no part of the motor extends in the selected direction beyond that area on the core. Elsewhere around the core, the casing encloses the core and may be spaced outwardly from the core to provide ventilating passages. Thus, the motor has the appearance of having been flattened on the side facing in the selected direction to provide a minimum distance from the center of the core (the shaft axis of the motor) to the periphery of the motor.

The drawing shows an electric motor for driving a circular saw blade, for example, and embodying the features of the present invention. From an electrical standpoint, the motor shown is a conventional single phase capacitor start motor having a generally annular stator, indicated generally at 11 in FIG. 2 and a conventional squirrel cage rotor, indicated generally at 12 in FIG. 2, disposed concentrically within the stator. The rotor is rigidly secured on an axially extending shaft 13. The stator 11 and rotor 12 are substantially enclosed by a longitudinally extending casing 14 and a pair of end bells 16 and 17 which abut the opposite ends of the casing and are secured thereto as by bolts 15.

The end bells 16 and 17, in addition to enclosing the ends of the motor also support the shaft 13, and are provided with bearings (not shown) in which the motor shaft 13 is journaled. One end of the shaft 13 projects through the end bell 17, as shown in FIG. 1, and is provided, for illustrative purposes, with a circular saw blade 18. The saw blade 18 may be rigidly secured on the shaft 13 by a pair of collars 19 and 21, a washer 22 and a nut 23 threaded on the end of the shaft. The end bell 17 is also provided with a plurality of ventilating openings 20 for permitting air to circulate into the motor. Attached to the underside of the casing 14 is a box 24 into which a power cable 25 for the motor is connected. The box 24 contains a capacitor (not shown) and is adapted to contain an overload protection device, if desired.

The stator 12 comprises a generally annular core 26 and field windings. The core 26 is a stack of annular core laminations 30 held, in this instance, in assembled relation by a plurality of circumferentially spaced longitudinally extending strips 27. The inner periphery of the core is provided with a plurality of longitudinally extending circumferentially spaced winding slots, one of which is shown at 28 in FIG. 2, in which are disposed the field windings, some of which are shown at 29 in FIG. 2.

The casing 14, while substantially enclosing the core 26, is provided with a longitudinal gap 31 opening upwardly and shown at the top of the motor in FIG. 2, thus, providing transversely spaced edge portions 32 and 33 on the opposite sides of the gap and in the form of longitudinal flanges which project toward each other in parallel coplanar relation and engage the outer surface of the core 26 on opposite sides of a longitudinally extending surface area 37 on the core 26. The surface of the core 26, where it is engaged by the flanges 32 and 33, is generally cylindrical and the flanges are provided with bearing surfaces 38 and 39 facing the core and curved as shown to bear against the core. It can be seen in FIG. 2 that the surface area 37 projects in exposed relation between the flanges 32 and 33 and is flush with the upper surfaces of the flanges.

The surface area 37 establishes the outermost limit of the motor in the upward direction, as shown in the drawings. In other words, no part of the motor shown extends upwardly beyond the area 37. To make this limit as close to the shaft as possible, the area 37 is flat, as if a small segment of each lamination were cut off on a chord across the lamination. It has been found that the laminations may be formed in this shape without unduly affecting the magnetic characteristics of the core, provided the surface 37 is located not too far inwardly from the nominal periphery of the core and not too close to the slots 28.

The casing 14, in the present instance, is a unitary member and is substantially a major segment of a circle in cross section. The inner diameter of the casing is greater than the outer diameter of the core and means is provided therebetween for positioning the core concentrically in the casing and in spaced relation from the casing wall to provide air passages around the core. To this end, the casing is provided with a plurality of circumferentially spaced inwardly projecting ribs 41 which bear against the periphery of the core 26. Longitudinally extending air spaces 42, shown in FIG. 2, located circumferentially around the core 26 inside the casing 14 result, thus providing good ventilation for the motor.

The clamping means, mentioned above, comprises in this instance one or more bolts interconnecting the edge portions 32 and 33 to force them and the ribs 41 into tight bearing engagement with the core. The present motor is provided with three such bolts 43, 44 and 46 which extend transversely of the motor through aligned sets of holes in the edge portions 32 and 33, the bolts 43 and 46 being located at the ends of the stator and the bolt 44 located intermediate the ends. FIG. 2 shows one set of holes 47 and 48 provided in the edge portions 32 and 33 respectively. It should be noted that all the bolts 43, 44 and 46 are in chordal relation to the core and are parallel to the flanges 32 and 33. It should be further noted that the core 26 is located between the end bolts 43 and 46. The bolts are insulated from the core by tubular insulators 51 mounted on the bolts between the flanges.

As shown in FIG. 1, the core 26 is provided with a transverse slot 49 intermediate the ends of core for accommodating the intermediate bolt 44. The slot 49 is formed by simply cutting off the edges of a group of adjacent laminations at the bolt location to provide clearance for the bolt. The cut-off laminations thus form the slot 49. It has been found that this does not materially affect the magnetic characteristics of the core. Moreover, in short motors, bolts intermediate the ends of the core are generally unnecessary and may be eliminated.

The present motor is intended to be mounted on a supporting frame. Accordingly, the casing is provided with a hub 52 adapted to be connected to such supporting frame for rotative adjustment. The hub 52 is located on the casing 14 so that it is circumferentially spaced from the gap 31. In the present instance the hub is located 90° from the center of the gap and midway, approximately, from the ends of the motor.

The most practical mode of forming the casing is by casting. Initially, as cast, the casing is provided with a pair of integral transversely extending ribs, shown in dotted lines at 56, which interconnect the edge portions 32 and 33 and bridge the space therebetween. The ribs are located beyond the limit established by the area 37. The ribs 56 hold the casing rigid during the machining of the casing so that such machining can be accurately accomplished without difficulty. Thereafter, the ribs are removed, as by milling, so that the upper surfaces of the edge portions 32 and 33 are flat, as shown by solid lines in the drawing. After the ribs 56 are removed, the casing is sufficiently flexible, as a result of the gap 31, to permit the edge portions 32 and 33 to be drawn toward each other by the bolts 43, 44 and 46 sufficiently to effect bearing engagement of the flanges 32 and 33 and the ribs 41 with the periphery of the core.

From the foregoing it can be seen that the present invention provides a novel electric motor in which the distance from the motor shaft to a designated area on the periphery of the motor is reduced to a minimum, without a corresponding sacrifice of desirable motor characteristics. Moreover, the motor is easily and inexpensively manufactured.

Although the invention has been described in connection with a specific structural embodiment of the invention, it is to be understood that various modifications and alternative structure may be resorted to without departing from the scope of the invention as defined in the following claims.

I claim:

1. In an electric motor, a stator-frame assembly comprising a casing having a longitudinal gap to provide a pair of longitudinally extending transversely spaced edge portions, a generally annular core disposed in said casing, said core having a longitudinally extending area of its peripheral surface exposed through said gap, and clamping means extending across said gap for pulling said edge portions toward each other to clamp said core in said casing, the outermost point on said area establishing substantially the outer limit for said assembly throughout the length thereof.

2. An assembly according to claim 1 in which said core has spacer means comprising a plurality of inwardly projecting circumferentially spaced ribs on said casing which have bearing engagement with the periphery of said core by said clamping means for locating said core in said casing in spaced relation thereto.

3. An assembly according to claim 1, in which said clamping means comprises a plurality of transversely extending longitudinally spaced bolts interconnecting said edge portions.

4. An assembly according to claim 1, in which said clamping means comprises a pair of transversely extending bolts interconnecting said edge portions at the opposite ends of said casing, said core being positioned between said bolts.

5. An assembly according to claim 1, in which said clamping means comprises a plurality of longitudinally spaced transversely extending bolts interconnecting said edge portions and being in chordal relation to said core.

6. An assembly according to claim 1, in which each of said edge portions is in the form of a flange, said flanges projecting toward each other and engaging said core on opposite sides of said area to close the space between said casing and said core.

7. In an electric motor, a stator-frame assembly comprising a casing having a pair of longitudinally extending transversely spaced edge portions, a generally annular core disposed in said casing, spacer means interposed between said casing and said core for locating said core in spaced relation in said casing, said core having a longitudinally extending area of its peripheral surface located between said edge portions, said core being flattened within said area and exposed to form part of the periphery of said assembly, and clamping means for pulling said edge portions toward each other thereby clamping said casing on said core, the outermost point on said area establishing the outer limit for said assembly throughout the length thereof in the direction parallel to a line from the center of said core to the center of said area.

8. In an electric motor, a stator-frame assembly comprising an arcuate casing having a pair of longitudinally extending spaced edge portions, said edge portions projecting toward each other on a chord connecting the ends of the arc of said casing, a generally annular core disposed on said casing, spacer means interposed between said casing and said core for locating said core concentrically within said casing and spaced from said casing, said core having a longitudinally extending area of its peripheral surface located between said edge portions, said core being flattened in said area and substantially flush with said edge portions to define a chordal plane, and clamping means for pulling said edge portions toward each other, thereby clamping said casing on said core, said plane establishing the outer limit of said assembly.

9. An assembly according to claim 8, in which said edge portions are each provided with an arcuate surface facing said core, said arcuate surfaces bearing against the peripheral surface of said core adjacent opposite sides of said area.

10. In an electric motor, a stator-frame assembly comprising casing having a pair of longitudinally extending transversely spaced edge portions, a generally annular core disposed in said casing, spacer means interposed between said casing and said core for locating said core in spaced relation in said casing, said core having a longitudinally extending flat area of its peripheral surface exposed and located between said edge portions, and a plurality of longitudinally spaced bolts interconnecting said edge portions, said bolts being located inwardly from and parallel to said area and clamping said casing on said core.

11. In an electric motor, a stator-frame assembly comprising a casing having a pair of longitudinally extending transversely spaced edge portions, a generally annular core disposed in said casing, spacer means interposed between said casing and said core for locating said core in spaced relation in said casing, said core having a longitudinally extending flat area on its peripheral surface located between said edge portions and a groove extending transversely across said area intermediate the ends of said core, and a bolt interconnecting said edge portions and clamping said casing on said core and extending through said groove.

12. In an electric motor, a stator-frame assembly comprising a casing having a pair of longitudinally extending transversely spaced edge portions, a generally annular core disposed in said casing, spacer means interposed between said casing and said core for locating said core in spaced relation in said casing, said core having a longitudinally extending flat area on its peripheral surface located between said edge portions and a groove extending transversely across said area intermediate the ends of said core, a pair of bolts located at the opposite ends of said casing, and a third bolt disposed in said groove, said bolts interconnecting said edge portions and clamping said casing on said core, said bolts being in chordal relation to said bolts.

13. In an electric motor, a stator-frame assembly comprising a casing having a pair of longitudinally extending transversely spaced edge portions, a generally annular core disposed in said casing, spacer means interposed between said casing and said core for locating said core in spaced relation in said casing, said core having a longitudinally extending area on its peripheral surface located between said edge portion, clamping means for pulling said edge portions toward each other into engagement with said core, thereby clamping said core in said casing, said casing also having a hub portion extending to one side of said assembly and circumferentially spaced from said area, said hub portion being adapted to be connected to a supporting structure to provide a rotatable mounting for the motor.

14. A casing for an electric motor having a generally annular stator core, said casing comprising a cast shell generally arcuate in cross section and having longitudinally extending transversely spaced edge portions, said edge portions projecting inwardly on a chord connecting the ends of the arc, said casing having at least one accurately machined portion, said edge portions being initially interconnected by an integral transverse rib located outwardly from said chord for holding said edge portions in rigid relation during machining of said machined portion, said rib being removable to permit said edge portions to be drawn together for clamping said casing on the core.

References Cited in the file of this patent

FOREIGN PATENTS

| | | |
|---|---|---|
| 233,842 | Germany | Apr. 22, 1911 |
| 951,583 | Germany | Oct. 31, 1956 |